United States Patent [19]

Lewis

[11] Patent Number: 4,652,881
[45] Date of Patent: Mar. 24, 1987

[54] EFFICIENT ADAPTIVE FILTER BANK

[76] Inventor: Bernard L. Lewis, 13318 Ft. Washington Rd., Ft. Washington, Md. 20744

[21] Appl. No.: 569,685

[22] Filed: Jan. 10, 1984

[51] Int. Cl.[4] ............................................. G01S 13/52
[52] U.S. Cl. ..................................... 342/160; 342/15; 342/22
[58] Field of Search ............. 343/5 CE, 5 FT, 5 NQ, 343/7.7, 374, 375, 17.2 PC, 18 E, 5 SW; 364/724, 726, 825, 827

[56] References Cited

U.S. PATENT DOCUMENTS

| | | | |
|---|---|---|---|
| 3,202,990 | 8/1965 | Howells | 343/381 |
| 3,978,483 | 8/1976 | Lewis et al. | 343/381 |
| 4,044,359 | 8/1977 | Applebaum et al. | 343/379 |
| 4,075,633 | 2/1978 | Lewis | 343/381 |
| 4,086,592 | 4/1978 | Lewis et al. | 343/381 |
| 4,093,950 | 6/1978 | Rhys | 343/7.7 |
| 4,359,736 | 11/1982 | Lewis | 343/17.2 PC |
| 4,468,794 | 8/1984 | Waters et al. | 364/724 |

OTHER PUBLICATIONS

E. Ferrara, Jr., "The Time-Sequenced Adaptive Filter"; (IEEE Trans. on Circuits and Systems, vol. CAS-28, No. 6, 6/81; pp. 519-523).

Primary Examiner—Thomas H. Tarcza
Assistant Examiner—Bernarr Earl Gregory

[57] ABSTRACT

An N-point Fourier transform circuit for a moving target indicator system including a delay circuit with $2N-2$ delays, N frequency filters, a processor for forming a main signal and $N-1$ auxiliary signals via time sample manipulation, a Gram-Schmidt adaptive canceller circuit for decorrelating the $N-1$ auxiliary signals from the main signal, and a first and second commutating switches. The first switch tracks a given set of N time samples through the delay circuit. The second switch switches the given set of N time samples through a different successive frequency filters of the N frequency filters every transmission. The first switch tracks in synchronism with the second switch and switches to obtain a new given set of N time samples every NT seconds.

25 Claims, 1 Drawing Figure

EFFICIENT ADAPTIVE FILTER BANK

BACKGROUND OF THE INVENTION

The present invention relates generally to moving target indicator systems for separating radar or sonar moving target echoes from the echoes from non or slowly moving clutter. More particularly, the present invention relates to an MTI system for removing clutter with a minimum amount of hardware.

In general, a radar or sonar signal processing system is designed to reduce the presence of undesired signals received together with desired signals. In the case of an MTI system, the received radar or sonar return pulses include desired moving target reflections and undesired clutter from the sea surface, slow moving rain squalls, chaff, etc. The radar clutter, because of its low or nonexistent velocity component, is correlated from pulse to pulse. However, moving targets above a certain velocity have a measurable phase change from pulse to pulse and thus are uncorrelated. The purpose of the MTI system is to cancel all correlated signals on a pulse to-pulse basis, thus cancelling clutter while passing uncorrelated signals such as moving target reflections.

It is known however, that if M uncorrelated clutter sources contribute to the signal, then (M+1) pulses must be utilized to cancel these M clutter contributions. Accordingly, M separate auxiliary channels are required in order to optimally cancel all clutter components between a main signal and a set of M uncorrelated samples.

A variety of systems are currently available for optimally separating moving target echoes from clutter echoes via the use of adaptive filter banks employing matrix inverse or maximum entropy algorithms. However, each of these systems requires a separate set of circuitry for each auxiliary channel thus requiring a large amount of expensive and complex hardware. Accordingly, such systems for removing M sources of correlated clutter are extremely bulky and impractical for use in many radar and sonar environments.

OBJECTS OF THE INVENTION

Accordingly, it is an object of the present invention to significantly reduce the amount of hardware and expense required in removing M correlated signals from a main radar signal.

It is a further object of the present invention to utilize a single adaptive decorrelating canceller system for removing M contributions from correlated clutter.

Other objects, advantages, and novel features of the present invention will become apparent from the detailed description of the invention, which follows the summary.

SUMMARY OF THE INVENTION

Briefly, the above and other objects are realized in an N-point Fourier transform circuit for a moving target indicator system with an interpulse period of T, comprising: a delay circuit for taking a plurality of adjacent time samples of a signal taken T seconds apart; N frequency filters, with each frequency filter comprising N parallel time sample lines, with each time sample line having an input, an output, and a phase shifter disposed therein; a processor for forming a main signal via time sample addition and N−1 auxiliary signals via various additions and subtractions of the N time samples from the output lines of a given frequency filter; an adaptive canceller for decorrelating the N−1 auxiliary signals from the main signal; a first switching circuit for tracking a given set of N time samples through the delay circuit on successive transmissions; and a second switching circuit for switching a given set of N time samples through successive frequency filters of said N frequency filters in synchronism with the first switching circuit.

In a preferred embodiment of the present invention, the delay circuit may comprise 2N−2 delay elements, each with a delay T and with a signal tap before each delay element and after the last delay element. The first switch may be an N-pole, 2N−1 position commutating switch for tracking N adjcent time samples through the delay circuit. Likewise, the second switch may be an N-pole $N^2$-position switch which shifts N positions to the next adjacent frequency filter every T seconds and repeats every NT seconds. Note that the second switch may be disposed either at the inputs to the N frequency filters, or at the outputs thereof. The adaptive canceller may be a Gram-Schmidt adaptive canceller.

DETAILED DESCRIPTION OF THE PREFERRED EMBODIMENT

Figure 1:
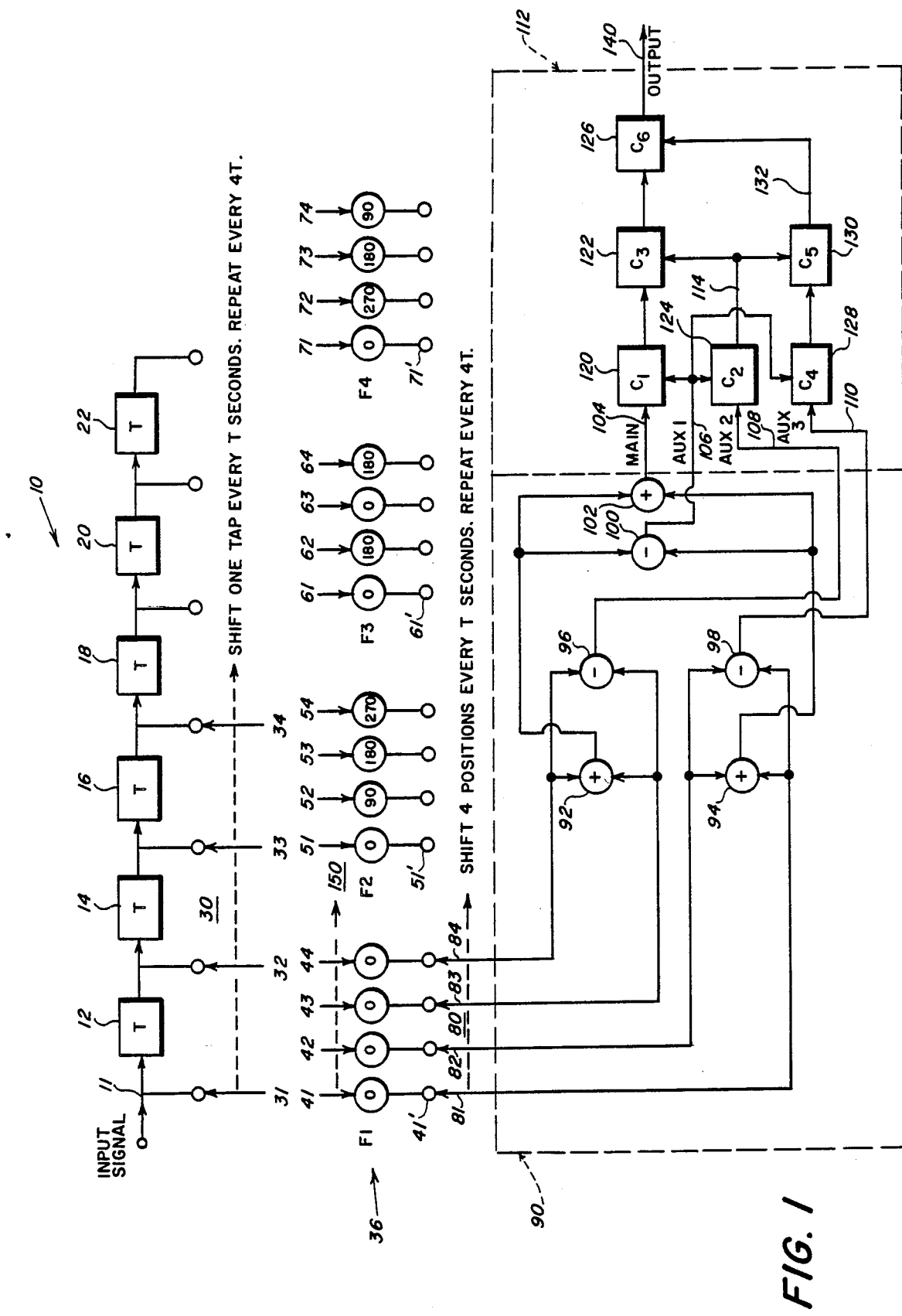
FIG. 1 is a schematic block diagram of one embodiment of the present invention.

The present invention provides a novel delay circuit and switching arrangement for switching the same arithmetic units (adders, subtractors, and cancellers) from frequency filter to frequency filter in a Fourier transform circuit on successive radar transmissions. In particular, a delay circuit is provided for obtaining 2N−1 time samples of a signal and then a special first switch is utilized to track the same time samples through the delay circuit. A second switch is utilized in synchronism with the first switch in order to shift these same time samples through successive frequency filters.

The present invention will be set forth, by way of example, in terms of 4-point digital transform circuit. However, it should be noted that this invention is clearly not limited to any particular number of Fourier points, and may clearly also be utilized with analog signals.

Referring now to FIG. 1, the present invention comprises a delay circuit 10 for obtaining 2N−1 time samples of an input signal. This delay circuit 10 may be comprised, by way of example, of a set of delay elements 12, 14, 16, 20, and 22, each with a delay of T, the interpulse period for the MTI system. A frequency filter bank 36 is then utilized in order to match the incoming signal with a set of frequency filter phase weights. In the example shown in FIG. 1, the frequency filter bank 36 comprises a set of phase weights (0, 0, 0, 0) for matching the frequency F1, a set of phase weights (0, 90, 180, and 270) for matching to a frequency F2, a set of phase weights (0, 180, 0, 180) for matching to a frequency F3, and a set of phase weights (0, 270, 180, and 90) for matching with a frequency F4. These four frequency filter sets of phase weights form a 4-point Fourier transform circuit.

Because this filter bank 36 is a 4-point Fourier transform circuit, four time samples are required in each of the frequency filters F1–F4. The first switch 30 is provided to select four adjacent time samples to be processed by the four filters F1, F2, F3, and F4, sequentially. In particular, the first switch 30 is used in conjunction with the delay circuit 10 in order to track the same four time samples over a period NT and to apply these same four time samples to successive filters. This tracking feature is accomplished in the embodiment of FIG. 1 by means of a delay circuit 10 with 2N−2 delay elements and 2N−1 signal taps, in combination with an N-pole, 2N−1 position first switch 30. In the present case, N=4. It can be seen that every interpulse period T, the signal on each of the taps 31, 32, 33, and 34 moves up through the interpulse period delay T to the next adjacent tap. Thus, it can be seen that by shifting the 4 poles of the first switch 30 by one tap every T seconds, the 4 poles 31-34 follow or track their respective time samples as those samples progress through the delay line 10. This commutating first switch repeats every 4 T seconds thus obtaining a new set of 4 time samples every fourth time sample.

The poles 31-34 of the first switch 30 may be connected in a number of ways to the filter bank 36. By way of example, the pole 31 could be hardwired to each of the first inputs 41, 51, 61, and 71 of the filters F1-F4. Likewise, the switch pole 32 could be hardwire connected to the phase shifter inputs 42, 52, 62 and 72 which comprise the second phase shifter input for each of the filters in the filter bank 36. The switch poles 33 and 34 may be likewise hardwire connected.

As noted previously, a single processor for developing a main signal and N−1 auxiliary signals is utilized in the present invention along with a single adaptive canceller circuit 112. In order to permit the use of only a single processor and adaptive canceller circuit, a second switch 80 is utilized in order to switch the given set of N time samples through successive frequency filters on successive transmissions. In one embodiment, this second switch 80 may be disposed between the frequency filter bank 36 and the processor unit 90 for switching this unit from frequency filter to frequency filter every T seconds. By way of example, this second switch 80 may be realized, in the case of a 4-point Fourier transform circuit, by a 4-pole 16-position switch which shifts 4 positions every T seconds, and repeats every 4T seconds.

In operation of the embodiment, when switch 30 is in its initial position as shown in FIG. 1. the second switch 80 is connected to apply the phase shifted 4 time-sample outputs from the first filter F1 to the processor 90. The first switch 30 and the second switch 80 remain in this first position for one radar interpulse period T. Then the first switch 30 shifts its 4 poles 31-34 by one tap to thereby follow the time samples as they progress through the delay line. Likewise, the second switch 80 shifts its 4 taps 81-84 by 4 positions to thereby connect its poles to the second frequency filter F2. These switches remain in this position for another radar interpulse period T. Then, the first switch 30 shifts all of its poles 31-34 another tap while the second switch 80 shifts an additional 4 positions to connect to the phase shifted outputs of the frequency filter F3. This process continues for 4 interpulse periods T, and then repeats. When the poles 31-34 for the first switch 30 commutate back to their initial positions, then a new set of 4 time samples is present at those poles and these time samples are tracked through the delay elements 12-22.

In a second embodiment of the present invention, the second switch may be connected between the first switch 30 and the inputs to the filter bank 36, as designated by numeral 150 in FIG. 1. In this embodiment, a given set of N time samples is switched from frequency filter to frequency filter on successive transmissions. Then, the processor unit 90 may have its inputs appropriately hardwired to the outputs from the frequency filters, i.e., input 81 is connected to each of the first output lines (41′, 51′, 61′, 71′) of the frequency filters, input 82 is connected to each of the second output lines (42′, 52′, 62′, 72′) of the frequency filters, etc.

In a third embodiment, a third N-pole, $N^2$ position switch may be disposed in series with the first switch 30, and in conjunction with a second switch at switch location 80 at the frequency filter outputs. Thus. there would be two N-pole, $N^2$ position switches, one at the inputs and one at the outputs to the frequency filters, which cycle in synchronism, N positions every T seconds. This switching arrangement applies the time samples to only one frequency filter in the filter bank 36, at a time.

It can be seen that regardless of which switching embodiment is utilized, the output from only one frequency filter from the filter bank at a time is applied to the processor unit 90, thereby permitting the same arithmetic units to be used for each filter.

As noted previously, the processor 90 manipulates the 4 time samples applied thereto in order to obtain a main signal on line 104 and three separate auxiliary signals on lines 106, 108, and 110. In the embodiment shown in FIG. 1 with the second switch at switch location 80, the main signal on line 104 is obtained by pairwise adding the time sample signals together. More specifically, the time samples from the poles 81 and 82 are added together in the adder 94, while the time samples from the poles 83 and 84 are added together in the adder 92. The resulting sums from the adder 92 and the adder 94 are then added together in an adder 102 to obtain the main signal on line 104.

The auxiliary signals are obtained through various pairwise subtraction and addition operations. In particular, the sum of the time samples 81 and 82 from adder 94 is subtracted from the sum of the time samples on the poles 83 and 84 obtained from the adder 92 in the subtractor 100. The output signal from this subtractor 100 is the first auxiliary signal on line 106. Additionally, the time samples on the poles 83 and 84 are subtracted in the subtractor 96 to obtain a second auxiliary signal on line 108. Finally, the time samples on the poles 81 and 82 are subtracted in the subtractor 98 to obtain a third auxiliary signal on line 110. These three auxiliary signals on lines 106, 108, and 110 provide the signals for a three degree of freedom adaptive clutter canceller. Such a three degree of freedom canceller can cancel correlated signals from three separate noise or clutter sources.

A number of different adaptive canceller circuits may be utilized to implement the adaptive canceller 112 of FIG. 1. However, the Gram-Schmidt adaptive canceller appears to be the most efficient and the most accurate. This canceller is disclosed in the book, *Introduction to Adaptive Arrays* by R. A. Monzingo and T. W. Miller, John Wiley and Sons, 1980. This canceller is illustrated by way of example in the block 112 of FIG. 1. Each of the cancellers $C_1$, $C_2$, $C_3$, $C_4$, $C_5$, $C_6$, may be realized by any of a number of conventional adaptive closed or open loop cancellers. By way of example, each of these cancellers may utilize the design for a digital open loop canceller set forth in U.S. Pat. No. 4,086,592. However, if the circuit is to be analog in nature, these cancellers can be Howells-Applebaum adaptive loops, or Lewis-Hansen loops as described in U.S Pat. No. 3,978,483.

Each canceller in FIG. 1 has a main terminal shown entering the left side of the canceller, an auxiliary terminal shown entering from the bottom of the canceller, an output terminal shown leaving the right side of the canceller. Each of these cancellers acts to cancel correlated components between the signals applied to the main terminal and the auxiliary terminal, and to provide a residual signal at the output terminal which contains all of the uncorrelated components. In the present configuration, the canceller 120 ($C_1$) takes the main signal on line 104 at its main terminal and the first auxiliary signal on line 106 (comprising the difference of the sums from the adders 92 and 94) at its auxiliary terminal. The residue from the canceller 120 is applied to the main terminal of the canceller 122 ($C_3$).

A second auxiliary signal 108 (the difference between the time samples on poles 83 and 84) is then applied to the auxiliary terminal of the canceller 122 in order to cancel all of the signals in the main signal which are correlated therewith. However, the same vector components of the first auxiliary signal on line 106 which have been cancelled out of the main channel signal may also exist in this second auxiliary signal on line 108. It is therefore necessary to use the first auxiliary signal on line 106 to remove these same correlated components from this second auxiliary signal on line 108 so that it is not reintroduced into the main channel in the main channel canceller 122.

In order to accomplish this decorrelation of the second auxiliary signal, the second auxiliary signal is applied on line 108 to the main terminal of the canceller 124 ($C_2$) while the first auxiliary signal on line 106 is applied to the auxiliary terminal of the canceller 124. All of the correlated components between the first auxiliary signal on line 106 and the second auxiliary signal on line 108 are cancelled thereby preventing these correlated components from being reintroduced into the main channel in the canceller 122. The residue from the canceller 124 is then applied on line 114 to the auxiliary terminal of the canceller 122. Canceller 122 operates to cancel all of the correlated components between the main channel signal and this second auxiliary signal.

The residue from the canceller 122 is then applied to the canceller 126 ($C_6$) at the main terminal. The third auxiliary signal (obtained by subtracting the time samples on poles 82 and 81) must have all of the correlated components on the first and second auxiliary signals on lines 106 and 114, respectively, removed therefrom before application to the canceller 126. In order to remove the correlated components in the first and second auxiliary signals from the third auxiliary signal, the cancellers 128 and 130 are provided. The third auxiliary signal on line 110 is applied to the main terminal of the canceller 128 ($C_4$) while the first auxiliary signal on line 106 is applied to the auxiliary terminal 128. All of the correlated components between this first auxiliary signal on line 106 and this third auxiliary signal on line 110 are cancelled. The residue from this canceller 128 is then applied to the main terminal of the canceller 130 ($C_5$). The second auxiliary signal on line 114 is applied to the auxiliary terminal of the canceller 130. The canceller 130 again operates to remove the correlated components between this second auxiliary signal and the third auxiliary signal. The residue from the canceller 130 is applied on line 132 to the auxiliary terminal of the canceller 126. The canceller 126 operates to cancel all of the correlated components between the main terminal signal and this third auxiliary signal on line 132. The resulting residual output 140 from the canceller 126 is the main channel signal on line 104 with all of the correlated components from the first, second and third auxiliary signals on lines 106, 108, and 110, respectively, removed. This means that all interference from three interference sources has been removed from the main channel signal. The output 140 from this canceller 126 is the adaptive filter output with the signals from F1, F2, F3, and F4 appearing sequentially as the switches 30 and 80 cycle.

Each radar pulse received in the present system will have vector components from a moving target which will have a phase change from pulse to pulse and hence will be uncorrelated from pulse to pulse. In addition, the radar pulse will have components from stationary and slowly moving clutter which do not have a phase change from pulse to pulse and hence are correlated. In the present N-pulse system, $N-1$ sources of clutter having different velocities (i.e., clutter, slow moving rain squalls, and chaff) may be removed while passing the components that are uncorrelated. This type of adaptive canceller in an MTI system automatically develops weights which place the MTI cancellation notches at the velocities of the various clutter sources.

One of the main advantages of the present invention over the prior art is the significant hardware reduction permitted by switching the same arithmetic units (adders, subtractors, and cancellers) from frequency filter to frequency filter on successive radar transmissions. This hardware reduction is accomplished by the use of a specially designed delay circuit and switch for obtaining $2N-1$ time samples and tracking a given set of N of these time samples through the delay circuit. A second switch is then utilized to switch the given set of time samples through successive frequency filter outputs every transmission. The additional switching circuitry and the added delay elements required for this implementation are significantly less expensive than the cancellers, adders, and subtractors required for each frequency filter output in the prior art. In essence, only one set of processors and adaptive cancellers is required thereby reducing the hardware by a factor of N.

It should be noted that the present Fourier transform circuitry reduces the bandwidth by a factor of N, i.e., the Nyquist sampling rate is 1/N of the pulse repetition rate. In the present example, the Nyquist sampling rate is ¼ of the pulse repetition rate. In essence, because the Fourier transform circuit reduces the radar bandwidth by the number of points in the FFT, the rate required for sampling each output frequency port in order to preserve all of the information is less than the reciprocal of the total doppler bandwidth by the number of points in the FFT.

It should be noted that for a digital implementation, both an I and a Q time samples will be obtained for every range cell. Accordingly, two identical circuits will be required in order to process the I and Q components of the signals.

It should also be noted that in a digital embodiment the switches set forth in FIG. 1 may be implemented by digital gates driven by a clock counter which generates a clock pulse every interpulse period to control the gate positions.

It is again reiterated that the present invention can be implemented in either digital or analog fashion and can employ as many points in the Fourier transform circuit as desired.

It should be noted that there are a number of unique aspects to the present invention including the specially designed delay line in combination with the commutating first and second switches. Also, it should be noted that the generation of auxiliary difference signals from the time sample output ports of a Fourier transform circuit is unique in the art. The present design permits sidelobe cancellation in each subband on successive transmissions due to the storing of time samples in the specially designed series delay line.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An N-point Fourier transform circuit for a moving target indication system with signal interpulse period of T, comprising:
    a delay circuit for taking a plurality of adjacent time samples of a signal, taken T seconds apart;
    N frequency filters, with each frequency filter comprising N parallel time sample lines, with each time sample line having an input, an output, and a phase shifter disposed therein;
    a processor for forming a main signal via time sample addition and N−1 auxiliary signals via various time sample additions and subtractions of the N time samples from the output lines of a given frequency filter;
    an adaptive canceller for decorrelating said N−1 auxiliary signals from said main signal;
    a first switching circuit for tracking a given set of N time samples through said delay circuit; and
    a second switching circuit for switching said given set of N time samples through successive frequency filters on successive transmissions;
    wherein said first switching circuit switches in synchronism with said second switching circuit, said first switching circuit obtaining a new given set of N time samples every NT seconds.

2. An N-point Fourier transform circuit as defined in claim 1, wherein said second switching circuit is disposed to switch said processor from frequency filter output to frequency filter output on successive transmissions; and
    said first switching circuit provides said given set of N time samples to at least one frequency filter at a time.

3. An N-point Fourier transform circuit as defined in claim 2, wherein said delay circuit comprises 2N−2 delay elements, each with a delay T, and with a signal tap before each delay element and after the last delay element.

4. An N-point Fourier transform circuit as defined in claim 3, wherein said first switch is an N-pole, 2N−1 position commutating switch for switching said given set of N adjacent time samples from said delay circuit to said frequency filters, wherein said first switch shifts its N poles one tap every T seconds and repeats every NT seconds.

5. An N-point Fourier transform circuit as defined in claim 4, wherein said second switch is an N pole $N^2$-position switch which shifts N positions to the next adjacent frequency filter every T seconds and repeats every NT seconds.

6. An N-point Fourier transform circuit as defined in claim 5, wherein said adaptive canceller is a Gram-Schmidt adaptive canceller.

7. An N-point Fourier transform circuit as defined in claim 1, wherein said first switching circuit is connected to said second switching circuit; and
    said second switching circuit switches said given set of N time samples from frequency filter to frequency filter on successive transmissions.

8. An N-point Fourier transform circuit as defined in claim 7, wherein said delay circuit comprises 2N−2 delay elements, each with a delay T, and with a signal tap before each delay element and after the last delay element.

9. An N-point Fourier transform circuit as defined in claim 8, wherein said first switch is an N-pole, 2N−1 position commutating switch for switching said given set of N adjacent time samples from said delay circuit to said frequency filters, wherein said first switch shifts its N poles one tap every T seconds and repeats every NT seconds.

10. An N point Fourier transform circuit as defined in claim 9, wherein said second switch is an N-pole $N^2$-position switch which shifts N positions to the next adjacent frequency filter every T seconds and repeats every NT seconds.

11. An N-point Fourier transform circuit as defined in claim 10, wherein said adaptive canceller is a Gram-Schmidt adaptive canceller.

12. An N-point Fourier transform circuit for separating stationary echoes from moving targets in a moving target indication system with a signal interpulse period of T, comprising:
    a delay circuit for taking 2N−1 adjacent time samples of an MTI signal, taken T seconds apart;
    N frequency filter sets of parallel phase shifters, with N phase shifters and attendant time sample output lines for each set;
    an N-pole, 2N−1 position first commutating switch for commutatively selecting a given N adjacent time samples from said delay circuit for application to at least one frequency filter set of N phase shifters;
    an N pole, $N^2$-position second commutating switch for commutatively selecting successive discrete frequency filter sets of phase shifted time sample outputs from said N frequency filter sets of phase shifters every T seconds;
    a processor for forming a main signal via time sample addition and N−1 auxiliary signals via various additions and subtractions from a given discrete frequency filter set of N phase shifted time sample output lines; and
    an adaptive canceller for decorrelating said N−1 auxiliary signals from said main signal;
    wherein said first switch switches in synchronism with said second switch to provide said given N adjacent time samples to the frequency filter set of phase shifters to which said processor is connected, said first switch changing to a new given N adjacent time samples every NT seconds.

13. An N-point Fourier transform circuit as defined in claim 12, wherein said delay circuit comprises 2N−2 delay elements, each with a delay T, and with a signal tap before each delay element and after the last delay element, wherein said first commutating switch shifts its N poles one tap every T seconds and repeats every NT seconds, while said second commutating switch shifts N positions to a different discrete set of phase shifter output lines every T seconds and repeats every NT seconds.

14. An N-point Fourier transform circuit as defined in claim 13, wherein said adaptive canceller is a Gram-Schmidt adaptive canceller.

15. An N-point Fourier transform circuit as defined in claim 14, wherein said N-pole first switch has the nth pole thereof connected to nth phase shifter for each of said N frequency filter phase shifter sets, where $1 \leq n \leq N$.

16. A method for separating moving targets from non or slowly moving clutter wherein a plurality of adjacent time samples of a signal are taken T seconds apart, where T is the interpulse period, further including a bank of N frequency filters, a processor for forming a main signal and $N-1$ auxiliary signals from N time samples, and an adaptive canceller for decorrelating said $N-1$ auxiliary signals from said main signal, said method comprising the steps of:

switching a given set of N time samples of said signal to at least one frequency filter in said bank of frequency filters;

switching said processor from frequency filter output to frequency filter output every T seconds;

wherein said first switching step switches in synchronism with said second switching step to provide said given set of N time samples to the frequency filter in said bank to which said processor is connected; and switching to a new set of N time samples for application to said bank of frequency filters every NT seconds.

17. A method as defined in claim 16, further comprising the step of taking $2N-1$ time samples of said signal.

18. A method as defined in claim 17, comprising the step of utilizing said adaptive canceller to perform Gram-Schmidt processing to decorrelate said $N-1$ auxiliary signals from said main signal.

19. An N-point Fourier transform circuit for a moving target indication system with a signal interpulse period of T, comprising:

a delay circuit for taking a plurality of adjacent time samples of a signal, taken T seconds apart;

N frequency filters, with each frequency filter comprising N parallel time sample lines, with each time sample line having an input, an output, and a phase shifter disposed therein;

a processor connected to the outputs of said N frequency filters for forming a main signal via time sample addition and $N-1$ auxiliary signals via various time sample additions and subtractions of the N time samples from the output lines of a given frequency filter;

an adaptive canceller for decorrelating said $N-1$ auxiliary signals from said main signal;

a first switching circuit for tracking a given set of N time samples through said delay circuit;

a second switching circuit for switching said given set of N time samples from frequency filter to frequency filter on successive transmissions;

wherein said first switching circuit switches in synchronism with said second switching circuit, said first switching circuit obtaining a new given set of N time samples every NT seconds.

20. An N-point Fourier transform circuit as defined in claim 19, wherein said delay circuit comprises $2N-2$ delay elements, each with a delay T, and with a signal tap before each delay element and after the last delay element.

21. An N-point Fourier transform circuit as defined in claim 20, wherein said first switch is an N-pole, $2N-1$ position commutating switch for switching said given set of N adjacent time samples from said delay circuit to said second switch, wherein said first switch shifts its N poles one tap every T seconds and repeats every NT seconds.

22. An N-point Fourier transform circuit as defined in claim 21, wherein said second switch is an N-pole $N^2$-position switch which shifts N positions to the next adjacent frequency filter every T seconds and repeats every NT seconds.

23. An N-point Fourier transform circuit as defined in claim 22, wherein said adaptive canceller is a Gram-Schmidt adaptive canceller.

24. A method for separating moving targets from non or slowly moving clutter including a delay circuit for taking $2N-1$ adjacent time samples of a signal T seconds apart, where T is the interpulse period, further including a bank of N frequency filters, a processor connected to said filter bank for forming a main signal and $N-1$ auxiliary signals from N time samples, and an adaptive canceller for decorrelating said $N-1$ auxiliary signals from said main signal, said method comprising the steps of:

tracking a given set of N time samples of said MTI signal through said delay circuit;

switching said given set of N time samples from frequency filter to frequency filter every T seconds;

wherein said tracking step operates in synchronism with said switching step; and commutating to a new set of N time samples to be tracked through said delay circuit every NT seconds.

25. A method as defined in claim 24, comprising the step of utilizing said adaptive canceller to perform Gram-Schmidt processing to decorrelate said $N-1$ auxiliary signals from said main signal.

* * * * *